(12) United States Patent
Craft et al.

(10) Patent No.: US 6,779,363 B1
(45) Date of Patent: Aug. 24, 2004

(54) METHOD FOR PREGOBBING AN OPTICAL FIBER PREFORM AND SYSTEM PRODUCING OPTICAL FIBER THEREFROM

(75) Inventors: Tony A. Craft, deceased, late of Hampstead, NC (US), by Kimberly M. Craft, Executrix; Kenneth J. Kelmer, Wilmington, NC (US); Theresa L. Watkins, Wilmington, NC (US)

(73) Assignee: Corning Incorporated, Corning, NY (US)

( * ) Notice: Subject to any disclaimer, the term of this patent is extended or adjusted under 35 U.S.C. 154(b) by 73 days.

(21) Appl. No.: 09/675,352

(22) Filed: Sep. 29, 2000

(51) Int. Cl.[7] ............................................. C03B 37/027

(52) U.S. Cl. ............................ 65/384; 65/435; 65/433; 65/404

(58) Field of Search ....................... 65/404, 435, 384, 65/433

(56) References Cited

U.S. PATENT DOCUMENTS

| | | | | |
|---|---|---|---|---|
| 2,736,141 A | | 2/1956 | Silverman et al. ............. | 49/77 |
| 5,059,229 A | * | 10/1991 | Blankenship et al. .......... | 65/32.5 |
| 5,897,681 A | * | 4/1999 | Lysson et al. ................ | 65/424 |
| 5,968,221 A | | 10/1999 | Blais ........................... | 65/377 |
| 5,979,189 A | * | 11/1999 | Campion et al. ............... | 65/391 |
| 6,209,358 B1 | * | 4/2001 | Wurier et al. .................. | 65/435 |
| 6,644,069 B2 | * | 11/2003 | Kohmura et al. .............. | 65/433 |
| 2001/0023598 A1 | | 9/2001 | Kohmura et al. .............. | 65/377 |

FOREIGN PATENT DOCUMENTS

| | | | |
|---|---|---|---|
| GB | 1530844 | 8/1977 | |
| JP | 25 98339 | 11/1990 | |
| JP | 11-079772 | 3/1999 | |
| JP | 2000-206344 | * 7/2000 | |
| WO | WO/90/13392 | 11/1990 | |
| WO | WO 00/76926 | 12/2000 | ......... C03B/37/012 |
| WO | WO 01/02312 | 1/2001 | ......... C03B/37/027 |

OTHER PUBLICATIONS

Smith, Adam, (1776) The Wealth of Nations, Book 1, Chapter 1.*
Patent Abstracts of Japan, JP 56–014441, Sumitomo Electric Ind. LTD., Feb. 12, 1981.
Patent Abstracts of Japan, JP 07–330362, Fujikura LTD., Dec. 19, 1995.
Patent Abstracts of Japan, JP 05–024877, Fujikura LTD., Feb. 2, 1993.
Patent Abstracts of Japan, JP 04–193732, Fujikura LTD., Jul. 13, 1992.
Patent Abstracts of Japan, JP 61–251536, Fujitsu LTD, Nov. 8, 1986.
Patent Abstracts of Japan, JP 02–164738, Furukawa Electric Co. LTD, Jun. 25, 1990.
Patent Abstracts of Japan, JP 52–060146, Fujitsu LTD, May 18, 1977.
Patent Abstracts of Japan, JP 01–028239, Yamagata Shinetsu Sekiei, Jan. 3, 1989.
U.S. patent application Ser. No. 09/522,220, Ruscher, filed Mar. 9, 2000.
Patent Abstracts of Japan, JP 10–081535, Sumitomo Electric Ind. Ltd., M. Katsusou, Mar. 31, 1998.
Patent Abstracts of Japan, JP 08–310825, Fujikura Ltd., T. Koichi, Nov. 26, 1996.
Patent Abstracts of Japan; JP04–193731; Fujikura LTD; Noriyuki et al.; Jul. 13, 1992.

* cited by examiner

*Primary Examiner*—John Hoffmann
(74) *Attorney, Agent, or Firm*—Randall S. Wayland

(57) ABSTRACT

A method for the pregobbing of an optical fiber preform to provide pre-optimized tip taper and system for drawing optical fiber therefrom. The downtime of an optical fiber drawing apparatus can be considerably shortened, by providing preforms that have a pre-optimized tip shape. Pre-optimized tips are provided which are melted off at the tip by an induction heater of a heating furnace. Preferably, the pregobbing furnace has substantially the same temperature profile as the draw furnace. Therefore, because the tip of the preform is optimized and unusable glass has been removed, throughput of the draw apparatus is advantageously increased. Moreover, the shape of the tip of the preform is optimized in that it has been exposed to the same temperature profile as it would have seen had the draw tip been formed in the draw furnace.

9 Claims, 6 Drawing Sheets

METHOD FOR PREGOBBING AN OPTICAL FIBER PREFORM AND SYSTEM PRODUCING OPTICAL FIBER THEREFROM

FIELD OF THE INVENTION

The invention relates to a system and method for manufacture of an optical fiber preform and optical fiber, and more particularly to a method and apparatus for preparing a preform's tip to expedite fiber draw.

BACKGROUND

The starting point in the method for manufacturing optical fiber is the preparation of an elongated, cylindrical quartz glass body, doped accordingly to provide the desired refractive index profile in the optical fiber. This so-called "preform" is introduced very slowly, by means of a downfeed device, into the high-temperature heating furnace of a draw tower. The preform is heated at its terminal end to temperatures sufficiently high to cause the tip of the preform to be gradually transformed to a honey-like consistency. After reaching the appropriate temperature, a glass gob melts off the preform by the influence of heat and gravity. Then an operator hand strips additional trash glass from the preform until a portion of the preform being drawn from contains good quality glass. At the point where good quality glass is readily strippable, the so-called "draw tip" has been formed on the preform. The draw tip consists of a generally tapering transition area located between the quartz glass cylinder portion of the preform and the thin fiber strand being drawn from the lowermost tip of the preform. The dimensions of the drawn fiber depend on the high-temperature furnace and the individual drawing conditions. However, a preferred glass strand of approximately 125 $\mu$m in diameter is continuously drawn off from the preform. It then passes through the cooling tube and passes through the coating system, which applies the protective sheath (coating). The coating system is located in the drawing tower below a diameter testing device. At the end of the draw tower, the fiber is wound onto a spool.

After a significant length of optical fiber is drawn, the length being dependent on the size of the preform, the preform is consumed. Production must be interrupted and the consumed preform must be replaced by a new one. Frequently, more than one hour elapses until the production of fiber with the required characteristics resumes. During this start-up time, the gobbing off of the quartz glass mass that cannot be used takes place as well as stripping and shaping of the draw tip. The shaping of the draw tip alone takes approximately 30 to 40 minutes. This is valuable time spent on the draw apparatus that, in some cases, is the bottleneck in the production process.

SUMMARY OF THE INVENTION

According to the invention, a system and method are provided. In particular a pregobbing system and method are provided for the pregobbing treatment of an optical fiber preform to provide a desired pre-optimized tip geometry prior to insertion into a draw apparatus. The method and system provide a preform having an optimized shape draw tip and permits, for example, the glass mass of an optical fiber preform that is not suitable for fiber drawing to melt off very rapidly and efficiently. The pregobbing operation is performed in a pregobbing apparatus separate from the draw furnace of the draw tower. Thus, since the pregobbing is accomplished in an "off line" fashion, i.e., in another apparatus, the fiber throughput from the draw apparatus is increased. Thus, it should be recognized that preforms including pre-optimized leading end tips (which are already appropriately melted off) result in considerably shortened downtime for the optical fiber draw apparatus.

In accordance with an embodiment of the invention, a system is provided for manufacturing an optical fiber preform comprising a pregobbing furnace adapted to heat the preform and cause glass to be removed, the pregobbing furnace having a temperature profile that is substantially the same as a temperature profile of a draw furnace utilized in a subsequent process to draw fiber from the preform. By having substantially equal temperature profiles, the tip is of the exact shape it would have been had the tip preparation been performed in the draw apparatus.

In accordance with another embodiment of the invention, a system is provided for manufacturing an optical fiber preform. The system comprises a pregobbing apparatus having a heating furnace with a first temperature profile, the pregobbing apparatus adapted to provide a pre-optimized tip shape on the optical fiber preform, and a draw furnace having a second temperature profile which is substantially equal to the first temperature profile, the draw furnace adapted to draw fiber from the preform having the pre-optimized tip shape. Preferably, the pregobbing apparatus includes an induction heater. Most preferably, both the pregobbing and the draw apparatus each include an induction heater.

In accordance with another embodiment of the invention, a method for manufacturing an optical fiber preform is provided comprising heating a consolidated optical fiber preform with an induction heating apparatus having a first temperature profile to allow a gob to drop under the influence of heat and gravity, removing glass from the preform until a draw tip having a pre-optimized shape is formed, and transferring the preform to a draw furnace of a draw apparatus. Preferably, the pre-optimized shape includes a tip taper having a tip length to change in radius ratio of between about 5 to about 12, and most preferably between about 6 to about 9. The "pre-optimized" tip shape as the term is used herein means a tip that has been pre-shaped such that it has a taper approximately equal to what it will have when fiber is being drawn therefrom in the draw apparatus. The ratios mentioned above represent a pre-optimized tip taper in accordance with the invention.

In accordance with another embodiment of the invention, a method for manufacturing an optical fiber is provided comprising the steps of heating a plurality of consolidated optical fiber preforms within a plurality of pregobbing apparatus, each apparatus including a furnace having a first temperature profile to form pre-optimized shape preform tip on each of the plurality of preforms, and transferring the plurality of preforms to a plurality of draw apparatus, each draw apparatus including a furnace and drawing optical fiber therefrom, the plurality of draw furnaces each having a second temperature profile substantially equal to the first temperature profile. Accordingly, a large number of draw apparatus may be supplied with pre-optimized preforms by a small number of pregobbing apparatus.

From the foregoing, it should be apparent that by using appropriately pregobbed preforms, that is, preforms that have pre-optimized draw tip shape, it is possible to advantageously reduce the down time of a glass fiber drawing unit by up to 60 minutes per replaced preform. In particular, since the high temperature draw furnace of the drawing tower needs to melt less quartz glass mass, this results in shorter heat-up times. Further, the transition phase between the initial melting and fiber draw takes considerably less time. Thus, the draw tower is in operation and producing production quality fiber more of the time. This is particularly true when the draw tip is optimized off-line in a separate pregobbing apparatus. In addition, it is not necessary to move the preform as deep into the draw furnace (time savings because of the generally low feed rate). Furthermore, stripping time at the draw tower for stripping off inadequate quality fiber is reduced. Thus, it should be recognized that off-line pregobbing represents a significant time savings.

BRIEF DESCRIPTION OF THE DRAWINGS

The invention is further explained below with reference to the accompanying drawings.

DETAILED DESCRIPTION OF THE PREFERRED EMBODIMENTS

Figure 1:
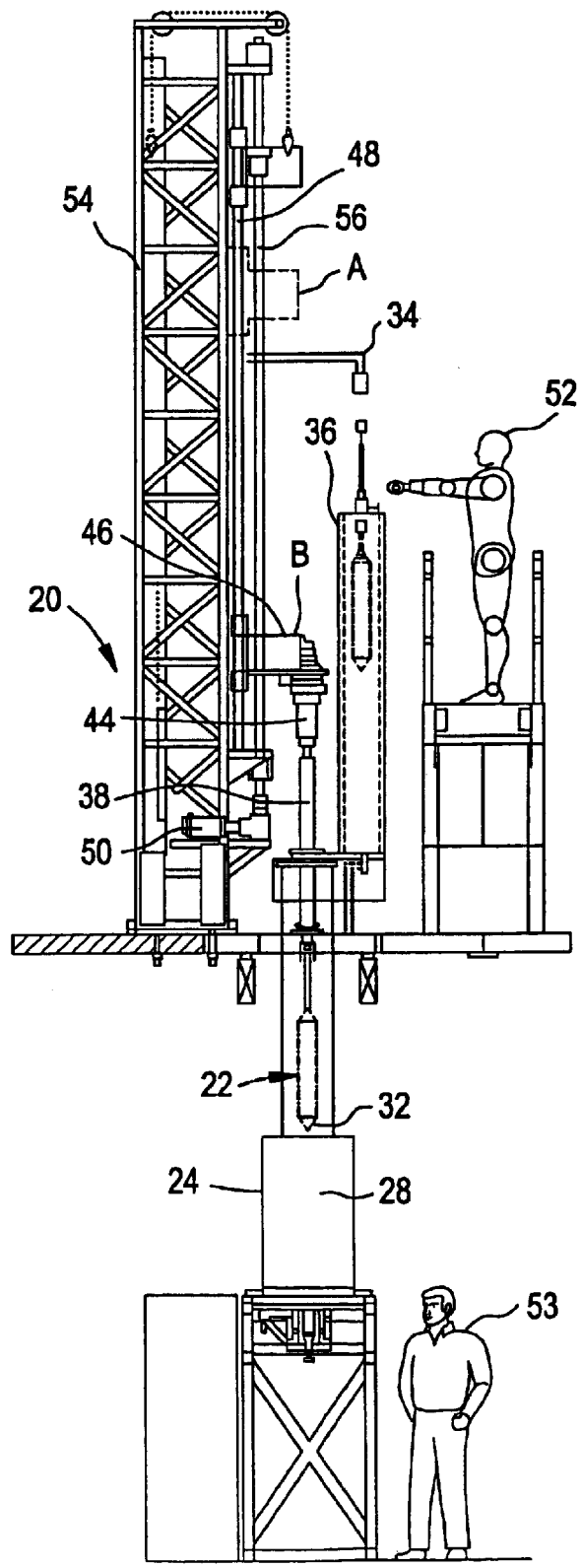
FIG. 1 illustrates a side view of an embodiment of an apparatus for pregobbing treatment of a preform in accordance with the invention.
Figure 3:
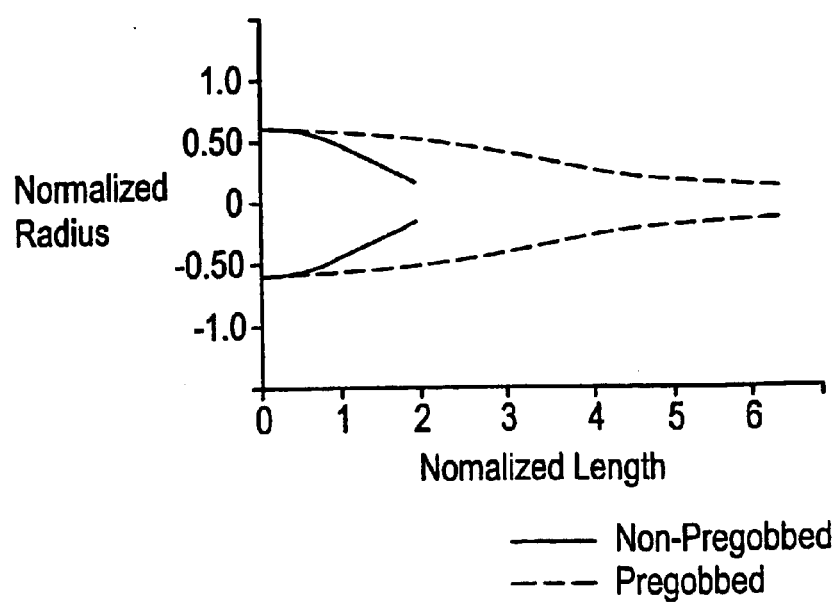
FIG. 3 is a graphical depiction of the shape of a Non-pregobbed and Pregobbed leading end of a preform.
Figure 6:
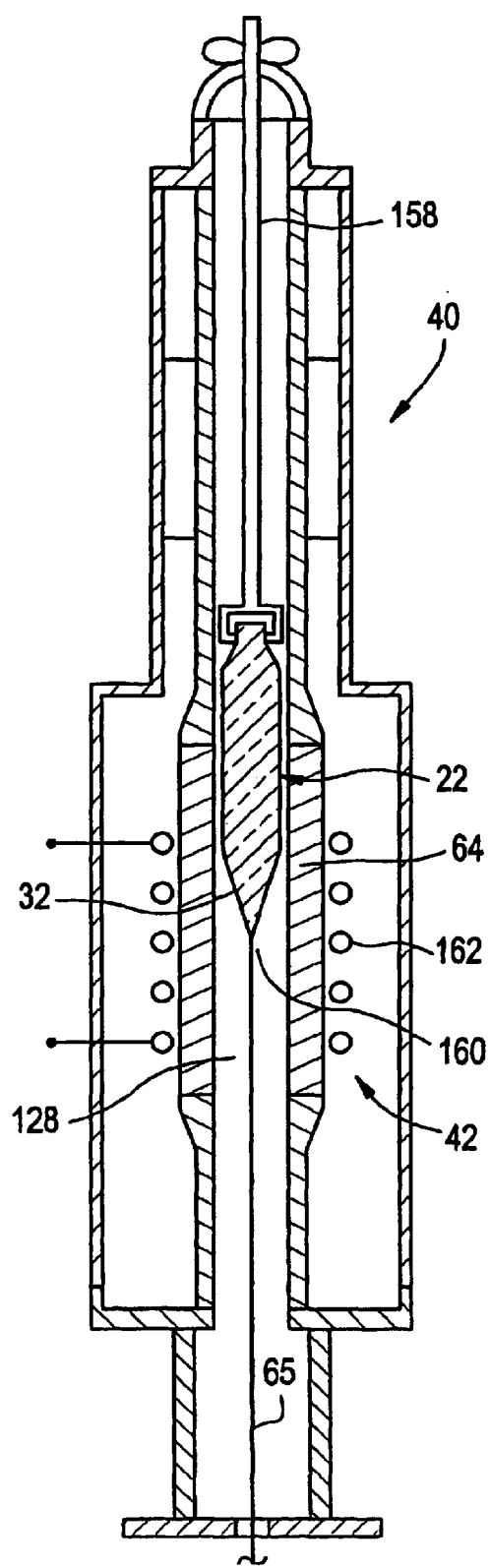
FIG. 6 illustrates a partial cross-sectional side view drawing of a draw apparatus.

An apparatus for performing the pregobbing operation off-line (in another apparatus other than the draw furnace) is shown schematically in FIG. 1. The pregobbing apparatus 20 is used for melting off the initial trash quartz glass mass from the preform 22, i.e., that glass at the ends of the preform that is not suitable for drawing adequate production quality fiber therefrom. In accordance with another embodiment, the apparatus optimizes the shape of the leading end (tip) of the preform 22 such that when transferred to the draw tower, drawing of fiber may readily commence. The apparatus 20 preferably includes an induction furnace 24 which preferably has a temperature profile identical to the furnace 42 utilized in the draw tower 40 (FIG. 6). The pregobbing furnace 24 produces a tapered draw tip 32 on the preform 22 (FIG. 4), such that when the preform is transferred to the draw tower (FIG. 6), the time needed to commence drawing fiber is dramatically reduced. Thus, the draw tower is capable of being utilized more of the time to produce production quality tele- or data-communications optical fiber. This afore-mentioned time reduction is because the draw tip has already been formed to the proper shape (pre-optimized) in the previous pregobbing furnace, and all or most of the trash glass has been removed. FIG. 3 illustrates a non-pregobbed and pregobbed tips and their relative dimensions. A pre-optimized tip preferably has a tip length to radius change ratio (as measured from the start of the tip to the end of the tip) of between about 5 to about 12, and most preferably between about 6 to about 9. The tip length is measure from the start of the taper intersecting the cylindrical part of the preform to the terminal leading end of the preform. The change in radius is measured from the start of the taper as just defined to the radius at the terminal leading end. Depending on where the glass break occurs on the preform after the pregobbing is completed, i.e., at what position along the tip the operator breaks off the solidified strand, the tip diameter may be very small, on the order of a few mm to about 15 mm.

Figure 4:
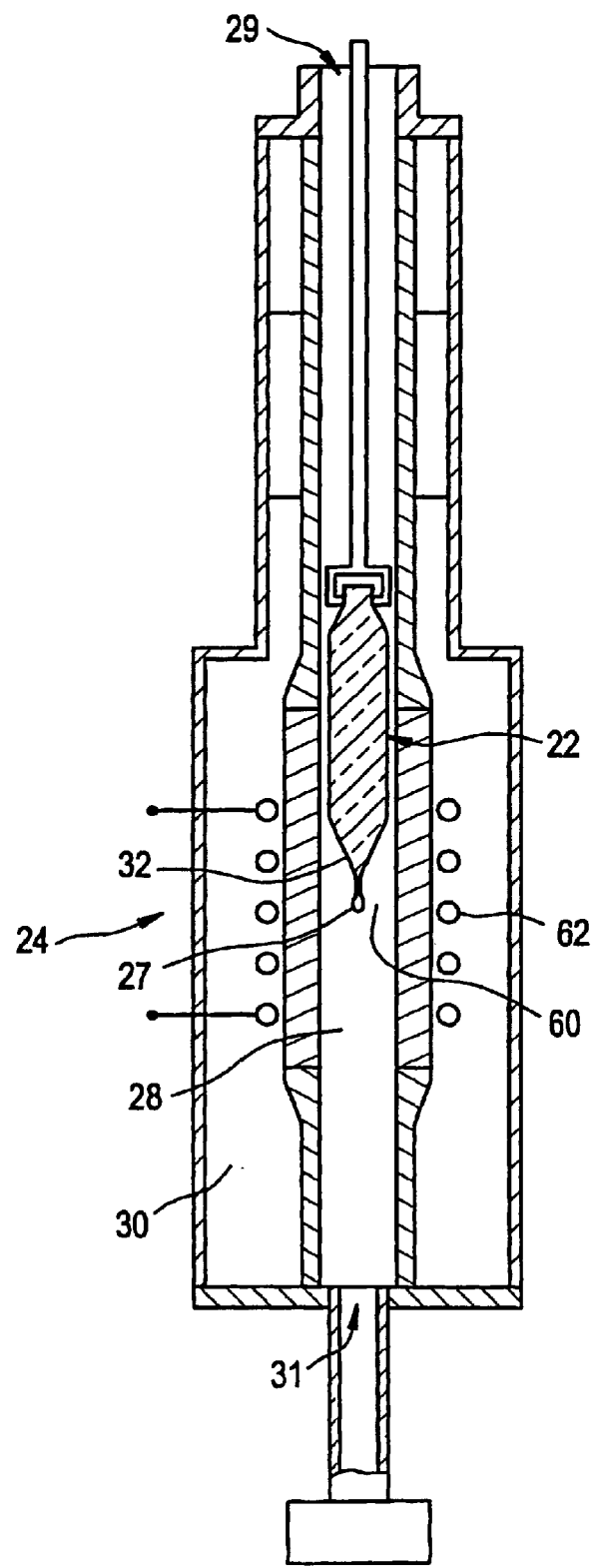
FIG. 4 illustrates a partial cross-sectional side view drawing of a pregobbing furnace in accordance with the invention.

The pregobbing heating furnace 24, as best illustrated in FIG. 4, has an induction heater with an induction coil 62 and a susceptor 64. The furnace 24 further includes a cylindrical heating chamber 28, heat insulation 30 surrounding the heating chamber, and and the induction coil 62 surrounding the susceptor 64, chamber and preform 22 and providing a hot zone 60 for heating the leading tip 32 of the preform 22. The induction coil, size and shape of the chamber, and insulation provided are such that the temperature profile of the pregobbing furnace 24 adjacent the tip is substantially identical to that of the draw furnace 42 (FIG. 6). This is accomplished in practice by having the internal components of the furnace be identical and adjusting the temperature controls for any slight differences.

Figure 5:
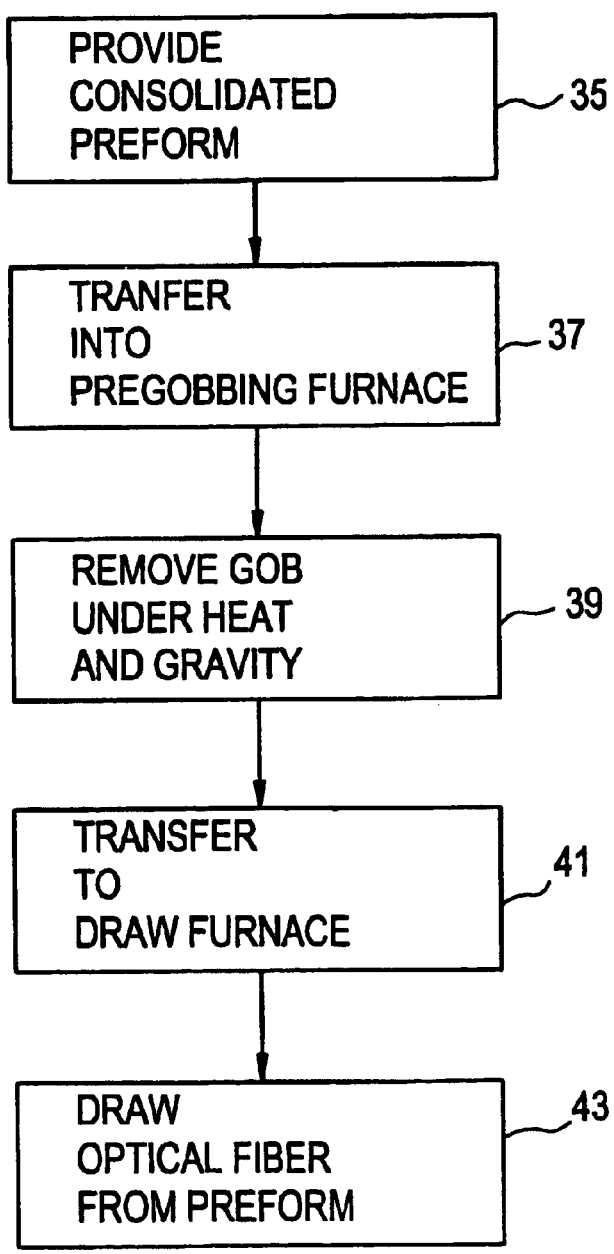
FIG. 5 illustrates a flow diagram of the method steps in accordance with the invention.

As best illustrated in FIG. 1 and FIG. 5 the consolidated preform 22 is provided as indicated in step 35 by traversing the preform 22 roughly into position by an overhead crane apparatus or track 34. The preform 22 may have come directly from a consolidation process or from an intermediate holding oven. Preferably, the preform 22 is housed within a carrier box 36 which surrounds the preform such that it is protected from contamination and collisions during transit to the pregobbing apparatus 20. An operator 52 disconnects the preform 22 from the track 34 and mounts the preform to a handle 38 extending from a motorized down feed apparatus 44. The down feed apparatus 44 is preferably mounted to a vertically moveable carriage 46 or other moveable structure. The down feed apparatus 44 extends downwardly from the lower end of the carriage 46 and the carriage operatively slides vertically along rails 48 to allow the preform to be raised and lowered as commanded.

The gross vertical motion of the preform 22 and carriage 46 relative to the apparatus frame 54 are controlled by a drive motor 50 mounted to the frame 54. Upon initiation by the operator 52 or 53, the motor 50 begins to rotate a lead screw 56 that parallels the rails 48. Lead screw 56 cooperates with a threaded portion (not shown) mounted in the carriage 46. Rotation of the lead screw 56 causes movement of the vertical position of carriage 46 thereby causing the carriage to move along the rails 48 and, thus, change the vertical position the preform 22. When loading the preform 22, the carriage 46 would be positioned at the location shown dotted and labeled "A." Once the preform 22 is suitably loaded onto the handle 38, the carrying case 36 is removed and put aside, and the preform 22 is then transferred into the pregobbing furnace 24 as indicated in step 37 (FIG. 5) by lowering the preform 22 into the entrance 29 (FIG. 4) of the pregobbing furnace 24. This is accomplished by rotating lead screw 56 such that carriage 46 slides downward along the slide rails 48.

The glass preform 22 is moved downward until the lowest portion of the tip 32 is positioned roughly within the hot zone 60 of the furnace 24 (FIG. 4). The lower preform 22 shown in FIG. 1 is shown being lowered into the chamber 28 of furnace 24 The preform 22 is allowed to remain at this position until the tip 32 softens to the point where a small gob 27 of glass drops off from the preform 22 by the action of heat and gravity alone. The gob drops through the exit 31 and into the trash. The rough position of the preform 22 within the furnace 24 is determined by a mirror.

Figure 2:
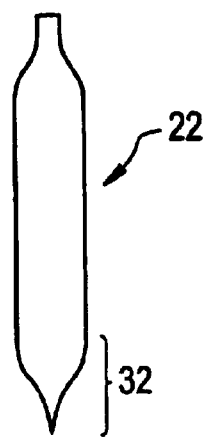
FIG. 2 illustrates a side view representative shape of a consolidated preform prior to pregobbing.

Once a small gob drops, the preform 22 is driven deeper into the hot zone 60 by down feed 44 such that the whole tip 32 (FIG. 2) is placed directly in the hot zone 60 of furnace 24. As the preform 22 continues to heat, a second larger gob drops by the influence of heat and gravity. The operator 53 pulls on the larger gob with scissors or other like tool and continues to strip trash glass with seeds or other defects from the preform 22 and appropriately scores and discards the trash glass as it drops and solidify. Both of these gob removal steps are accomplished in step labeled 39 of FIG. 5. However, it should be understood that there may be one or multiple gobs that drop depending on the initial conditions and the rate of stripping provided by the operator. After a predetermined amount of glass has been removed such that the operator 53 is sure that production quality glass is present in the preform from which acceptable production-quality optical fiber may be drawn, the process is stopped and the preform 22 is removed from the pregobbing furnace 24.

During the pregobbing process, the hot zone of the furnace is maintained at a temperature of between about 1800° C. and 2000° C., and more preferably between 1900° C. and 1950° C. Upon exposure of the terminal end of the tip to the hot zone, a small gob 27 will generally drop within about 25 min. The entire pregobbing process (including stripping) takes about 45–50 min.

After the pregobbing process is completed, the preform 22 is preferably placed back in the protective case 36. Preform 22 is then transferred in accordance with step 41 of FIG. 5 to a draw tower 40 (FIG. 6) where fiber is to be drawn therefrom. The preform 22 is preferably transferred by an overhead crane or monorail system. The preform 22 is removed from the carrier 36, connected to a draw furnace handle 158 and lowered into the draw furnace 42. The preform 22 with optimized draw tip 32 is driven into the hot zone 160 of the chamber 128 maintained with substantially the same temperature profile as that of the pregobbing furnace 24. Induction coil(s) 162 surrounding the preform 22 induce heat into the susceptor 64 to provide the hot zone 60 of approximately 1800° C.–2200° C. At step 43 (FIG. 5), sufficient tension is provided by a tractor or other tension providing means to draw optical fiber 65 from the preform 22. The optical fiber 65 preferably has a diameter of approximately 0.125 μm. The fiber 65 may then be cooled, coated and wound onto a spool as is conventional practice.

Figure 7:
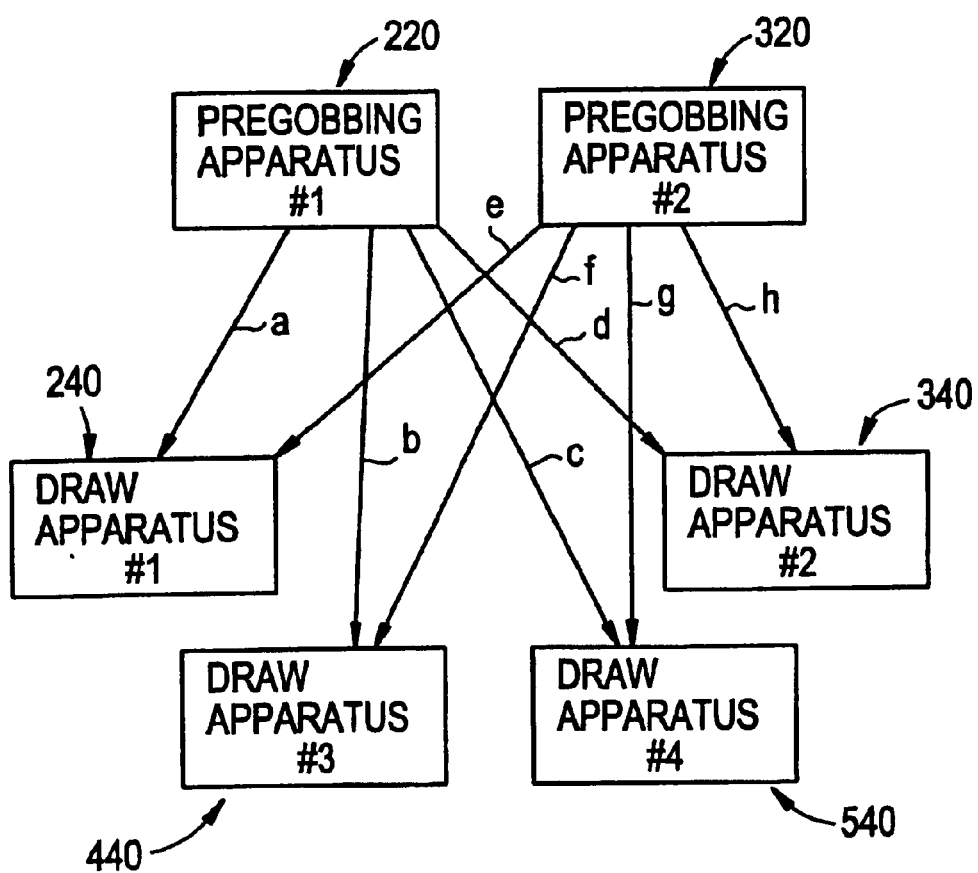
FIG. 7 illustrates a schematic view of a plurality of pregobbing apparatus supplying pre-optimized preforms to a plurality of draw apparatus.

In accordance with another embodiment of the invention, as best illustrated in FIG. 7, a plurality of pregobbing apparatus 220, 320 may be utilized to supply preforms with pre-optimized shape tips to a plurality of draw apparatus 240, 340, 440, 540. Because the pregobbing step generally takes less time than drawing fiber from a preform, there are a lesser number of pregobbing apparatus than draw apparatus. According to the method, a plurality of consolidated optical fiber preforms are heated within a plurality of pregobbing apparatus 220, 320. Each apparatus 220, 230 includes an induction furnace as shown in FIG. 4 having a first temperature profile to form pre-optimized shape preform tips on each of a plurality of preforms. Similarly, each of the plurality of draw apparatus 240–540 includes an induction furnace as heretofore described.

The preforms with pre-optimized tips are transferred to a plurality of draw apparatus 240–540 by any of the paths (a–h) shown. Thus, it should be recognized that any pregobbing apparatus may supply any draw apparatus. According to the invention, the plurality of draw furnaces 240–540 each have a second temperature profile substantially equal to the first temperature profile. Thus, a small number of pregobbing apparatus may be utilized to supply pre-optimized preforms to a much larger number of draw apparatus. It should be recognized that although two pregobbing apparatus are shown and four draw apparatus, a smaller number or larger number of draw apparatus may be utilized as dictated by production requirements. Further, a larger number of pregobbing apparatus may be employed.

It will be apparent to those of ordinary skill in the art that various modifications and variations can be made to the present invention without departing from the scope of the invention. Thus, it is intended that the present invention cover the modifications and variations provided they come within the scope of the appended claims and their equivalents.

What is claimed is:

1. A method for manufacturing an optical fiber preform, comprising the steps of:

(a) heating a consolidated optical fiber preform within a chamber of a heating furnace having a first temperature profile of a hot zone of the heating furnace wherein a gob drops under the influence of heat and gravity, (b) removing additional glass from the preform in the heating furnace until a draw tip having a pre-optimized tip shape is formed, and (c) transferring the preform to a draw furnace of a draw apparatus wherein a second temperature profile of a hot zone within the draw furnace is substantially identical to the first temperature profile.

2. The method of claim 1 wherein the step of heating is accomplished by at least one induction coil heating the preform.

3. The method of claim 1 wherein the step of heating includes heating the heating furnace to a temperature between about 1800° C. and 2000° C.

4. The method of claim 1 wherein the step of heating includes heating the heating furnace to a temperature between about 1900° C. and 1950° C.

5. A method for manufacturing an optical fiber preform, comprising the steps of:

a) heating a consolidated optical fiber preform within a chamber of a heating furnace having a first temperature profile of a hot zone of the heating furnace to wherein a gob drops under the influence of heat and gravity, b) removing additional glass from the preform in the heating furnace until a draw tip having a pre-optimized tip shape is formed wherein the pre-optimized tip shape includes a tip taper having a ratio, defined as tip length divided by radius change over the tip length, of between about 5 to about 12, and c) transferring the preform to a draw furnace of a draw apparatus wherein a second temperature profile of a hot zone within the draw furnace is substantially identical to the first temperature profile.

6. A method for manufacturing an optical fiber preform, comprising the steps of:

a) heating a consolidated optical fiber preform within a chamber of a heating furnace having a first temperature profile of a hot zone of the heating furnace wherein a gob drops under the influence of heat and gravity, b) removing additional glass from the preform in the heating furnace until a draw tip having a pre-optimized tip shape is formed wherein the pre-optimized tip shape includes a tip taper having a ratio, defined as tip length divided by radius change over the tip length, of between about 6 to about 9, and c) transferring the preform to a draw furnace of a draw apparatus wherein a second temperature profile of a hot zone within the draw furnace is substantially identical to the first temperature profile.

7. A method for manufacturing an optical fiber, comprising the steps of:

heating a consolidated optical fiber preform within a pregobbing apparatus including an induction furnace having a first temperature profile of a hot zone of the pregobbing apparatus thereby forming a pre-optimized shape preform tip, and transferring the preform to a draw apparatus including an induction furnace and drawing optical fiber therefrom, the draw apparatus having a second temperature profile of a hot zone of the draw apparatus substantially equal to the first temperature profile.

8. A method for manufacturing an optical fiber, comprising the steps of:

heating a plurality of consolidated optical fiber preforms within a plurality of pregobbing apparatus, each apparatus including an induction furnace having a first temperature profile in a hot zone thereof thereby forming a pre-optimized shape preform tip on each of the plurality of preforms, and transferring the plurality of preforms to a plurality of draw apparatus, each including an induction furnace and drawing optical fiber therefrom, the plurality of draw furnaces each having a second temperature profile in a hot zone thereof substantially equal to the first temperature profile.

9. The method of claim 8 wherein there are a lesser number of pregobbing apparatus than draw apparatus.

* * * * *

UNITED STATES PATENT AND TRADEMARK OFFICE
CERTIFICATE OF CORRECTION

PATENT NO. : 6,779,363 B1  Page 1 of 1
DATED : August 24, 2004
INVENTOR(S) : Craft et al.

It is certified that error appears in the above-identified patent and that said Letters Patent is hereby corrected as shown below:

Title page,
Item [56], References Cited, U.S. PATENT DOCUMENTS,
add the following:
-- 4,948,217
  6,386,001 B1
  5,284,499 A
  5,970,750
  5,152,818
  6,266,980 B1 --.

Signed and Sealed this

Thirtieth Day of May, 2006

JON W. DUDAS
*Director of the United States Patent and Trademark Office*